United States Patent
Pinto

(10) Patent No.: US 10,845,316 B2
(45) Date of Patent: Nov. 24, 2020

(54) METHOD AND APPARATUS FOR OPTICALLY INSPECTING THE PROFILE OF CONTAINERS, THE PROFILE INCLUDING THE BOTTOM

(71) Applicant: TIAMA, Vourles (FR)

(72) Inventor: Antonio Pinto, Charly (FR)

(73) Assignee: TIAMA, Vourles (FR)

( * ) Notice: Subject to any disclaimer, the term of this patent is extended or adjusted under 35 U.S.C. 154(b) by 254 days.

(21) Appl. No.: 15/768,848

(22) PCT Filed: Oct. 21, 2016

(86) PCT No.: PCT/FR2016/052727
§ 371 (c)(1),
(2) Date: Apr. 17, 2018

(87) PCT Pub. No.: WO2017/068295
PCT Pub. Date: Apr. 27, 2017

(65) Prior Publication Data
US 2019/0056332 A1    Feb. 21, 2019

(30) Foreign Application Priority Data
Oct. 21, 2015   (FR) ..................................... 15 60022

(51) Int. Cl.
*G01N 21/90*      (2006.01)
*G01B 11/24*      (2006.01)
*G01B 5/00*       (2006.01)

(52) U.S. Cl.
CPC ....... *G01N 21/9009* (2013.01); *G01B 5/0004* (2013.01); *G01B 11/24* (2013.01); *G01B 11/2433* (2013.01); *G01N 21/90* (2013.01)

(58) Field of Classification Search
None
See application file for complete search history.

(56) References Cited

U.S. PATENT DOCUMENTS

| 4,433,785 A | 2/1984 | Riggs et al. |
| 4,644,151 A * | 2/1987 | Juvinall ................ B07C 5/3408 |
| | | 235/494 |

(Continued)

FOREIGN PATENT DOCUMENTS

| FR | 3 000 193 | 6/2014 |
| GB | 1 063 479 | 3/1967 |

(Continued)

*Primary Examiner* — Shawn Decenzo
*Assistant Examiner* — Jarreas C Underwood
(74) *Attorney, Agent, or Firm* — Clark & Brody LP

(57) ABSTRACT

An installation (2) for optically inspecting containers (3) includes a support table (7) for containers, which table has a slide plate (8) on which the bottom of a container stands. The slide plate (8) includes a portion (18) that is movable under the action of an actuator (19) to move the movable portion (18) between a transfer position in which the movable portion is flush with the table, and an inspection position in which the movable portion (18) is set back relative to the slide plate (8). A light source (14) and a light sensor (15) are positioned so that, in the inspection position of the movable portion, the sensor can receive a light beam propagating in an inspection volume (V) in which there is situated at least a portion of the bottom (4) of the container spaced apart from the slide plate.

14 Claims, 5 Drawing Sheets

(56) References Cited

U.S. PATENT DOCUMENTS

| | | | | |
|---|---|---|---|---|
| 4,915,237 | A | * | 4/1990 | Chang .................... B07C 5/122 |
| | | | | 198/406 |
| 4,955,227 | A | * | 9/1990 | Fujita ...................... B07C 5/34 |
| | | | | 73/104 |
| 4,967,070 | A | * | 10/1990 | Ringlien ............... B07C 5/3412 |
| | | | | 250/223 B |
| 5,028,769 | A | * | 7/1991 | Claypool .............. B07C 5/3412 |
| | | | | 235/454 |
| 6,089,108 | A | | 7/2000 | Lucas |
| RE38,025 | E | * | 3/2003 | Skunes ............. H05K 13/0812 |
| | | | | 356/400 |
| 7,010,863 | B1 | * | 3/2006 | Juvinall ................. G01B 11/26 |
| | | | | 33/522 |
| 7,438,192 | B1 | * | 10/2008 | Kohler .................. B07C 5/3404 |
| | | | | 209/523 |
| 2006/0192954 | A1 | | 8/2006 | Semersky et al. |
| 2014/0063509 | A1 | * | 3/2014 | Nygaard ............... G01B 11/12 |
| | | | | 356/625 |
| 2014/0088916 | A1 | * | 3/2014 | Leconte ................ G01N 21/90 |
| | | | | 702/155 |
| 2017/0088366 | A1 | * | 3/2017 | Kawahara ............... B65B 43/50 |

FOREIGN PATENT DOCUMENTS

| | | |
|---|---|---|
| JP | 06-34576 | 2/1994 |
| JP | 2005-091060 | 4/2005 |
| JP | 2007-240469 | 9/2007 |
| JP | 2012-117900 | 6/2012 |
| WO | 2012/042582 | 4/2012 |
| WO | 2015/146628 | 10/2015 |

\* cited by examiner

METHOD AND APPARATUS FOR OPTICALLY INSPECTING THE PROFILE OF CONTAINERS, THE PROFILE INCLUDING THE BOTTOM

The present invention relates to the technical field of optically inspecting hollow articles or containers in the general sense, such as for example bottles, jars or flasks, in particular made of glass, by carrying out optical measurements involving at least a portion of the bottom of the container.

The invention finds particularly advantageous applications in the field of measuring the verticality of containers or detecting an orthogonality defect of the bottom of a container relative to its axis of symmetry, which can be referred to as a tilted bottom.

In the technical field of inspecting containers, in particular containers made of glass such as bottles, there is a need to measure the verticality of containers, in particular in order to guarantee bottling or filling thereof. Measuring the verticality of a container gives important information about the dimensional characteristics of a container, making it possible to detect a verticality defect when the measurement exceeds a reference value. In the state of the art, numerous technical solutions have been proposed in order to measure the verticality of containers.

In general manner, an installation for measuring the verticality of containers comprises a system for moving the containers to a station for optically inspecting containers. The containers are supported by a table while they are being transferred to the inspection station, and then while they are being taken away from the inspection station, after the inspection operation. The table presents a slide plate on which the bottom of a container stands while the container is being inspected in said station. During the inspection operation, the container is driven to rotate through at least one revolution about its axis.

Conventionally, the optical inspection station has at least one light source and one or more image sensors. Various inspection techniques are described in particular in the following documents: WO 2012/042582; U.S. Pat. No. 7,010,863; and EP 0 341 849. Patent application FR 3 000 193 proposes a method of measuring the verticality of containers seeking to remedy the drawbacks of known techniques. Such a measurement method requires taking matrix images, in particular of the heels of containers. Unfortunately, in practice there is a difficulty in obtaining a proper image of the heel of a container.

A device is also known from patent application GB 1 063 479 that serves to detect defects that appear in the bottoms of containers. Each container is moved on a support table to an optical inspection station that includes a container-receiving pad. The inspection pad is a suction pad, it is raised above the table, and it is driven in rotation during the inspection operation that is performed using light sources and light sensors.

Each container is thus moved for this inspection operation so that such handling is a source of degradation for the containers. The combination of upward movement and of movement in rotation leads to instability for the containers. Furthermore, a container is not continuously guided while it is being transferred from the support table to the inspection pad and from the inspection pad to the support table.

Patent applications WO 2015/146628 and US 2006/0192954 describe analogous installations seeking to drive each container in rotation and move it vertically during the inspection operation. Those installations present the same drawbacks as the device described in Document GB 1 063 479.

Patent application JP 2005/091060 describes an inspection installation for containers that are driven in rotation. For that purpose, each container is supported by wheels while being driven in rotation about its axis via the body of the container.

The present invention thus seeks to remedy the drawbacks of the prior art by proposing an installation comprising an optical inspection station that enables accurate measurements to be taken involving at least a portion of the bottom of a container, the measurements being performed without risk of degrading the containers.

To achieve this object, the installation comprises at least one optical inspection station for inspecting containers, the station including at least one light source and at least one light sensor, the installation including a support table for the containers, which table presents a slide plate on which the bottom of a container stands while it is being inspected by said station while it is positioned between the light source and the light sensor, the installation including a movement system for moving the containers and serving firstly to position the containers in succession on the slide plate while the inspection operation is taking place, and secondly to transfer them successively from the inspection station after the inspection operation.

According to the invention, the slide plate includes at least one retractable movable portion lying between stationary portions of the slide plate, the movable portion being movable under the action of an actuator for moving the movable portion between a transfer position in which the movable portion is flush with the table and an inspection position in which the movable portion is lowered relative to the stationary portions such that a portion of the bottom of the container is spaced apart from the slide plate, and in that the light source and the light sensor are positioned relative to the movable portion of the slide plate in such a manner that in the inspection position of the movable portion the sensor can receive a light beam emitted by the light source and propagating in an inspection volume in which at least a portion of the bottom of the container is situated spaced apart from the slide plate.

In addition, the installation of the invention may further include in combination at least one and/or more of the following additional characteristics:
- the slide plate defines two inspection volumes for two symmetrical portions of the bottom of the container by using two retractable movable portions, each lying between stationary portions of the slide plate;
- the movable portion(s) of the slide plate form portion(s) of a piece of movable equipment that is guided in vertical movement and that co-operates with a high abutment when the movable portion(s) of the slide plate occupy the transfer position, the piece of movable equipment being kept in contact with the abutment under the action of a resilient return force;
- the high abutment is provided with a system for providing vertical adjustment of the movable portion relative to the table;
- the movable portion(s) of the slide plate is/are releasably fastened to the movable equipment;
- for each movable portion, there is installed at least one air-blow nozzle opening out under the movable portion and communicating with an air-feed device;
- the actuator of the movable portion of the slide plate is connected to a control unit having connected thereto the system for moving the containers and the inspection station, the control unit controlling the actuator to place the movable portion:
in its transfer position in order to enable the movement system to bring a container onto the slide plate;
in its inspection position during the inspection operation; and
at the end of the inspection operation, in its transfer position to enable the movement system to transfer the container that is placed on the slide plate;
the light sensor is an image sensor; and
the light source and the image sensor are positioned relative to the movable portion of the slide plate in such a manner that in the inspection position of the movable portion the sensor can take an image of the profile of at least the insweep and of the neighboring portion of the bottom of the container spaced apart from the slide plate.

The invention also provides an inspection method using an optical inspection station to inspect containers standing via their bottoms on a support table, the method comprising the following steps:
positioning containers in succession on a slide plate of the table on which the bottom of a container stands during the inspection operation by said station while positioned between a light source and a light sensor; and
transferring the containers successively out from the inspection station after the inspection operation.

According to the invention, the method consists in:
positioning the container relative to at least one movable portion of the slide plate, which portion is placed prior to a container being brought into the inspection station in a transfer position in which said movable portion is flush with the table;
before the inspection operation, lowering the movable portion in which the movable portion is set back from the bottom of the container having at least a portion thereof spaced apart from the slide plate so that the sensor can receive a light beam propagating in an inspection volume in which there is situated at least a portion of the bottom of the container spaced apart from the slide plate;
keeping the movable portion in its inspection position during the inspection operation; and
after the inspection operation, and before transferring the container out from the inspection station, causing the movable portion to move into its transfer position.

In addition, the method of the invention may further consist in combination in at least one and/or more of the following additional characteristics:
lowering at least one movable portion of the slide plate into the inspection position in which two symmetrical portions of the bottom of the container are spaced apart from the slide plate;
during the inspection operation, causing the container to rotate about its vertical axis through at least one revolution;
during the rotation of the container, the light sensor recovering the light beams propagating in the inspection volumes in which there are situated at least two symmetrical portions of the bottom of the container spaced apart from the slide plate, and analyzing the recovered light beams to detect an orthogonality defect of the bottom relative to the axis of symmetry of the container; and
using an image sensor as the light sensor and in positioning the light source and the image sensor relative to the movable portion of the slide plate in such a manner that in the inspection position of the movable portion the sensor can take an image of the profile of at least of the insweep and of the neighboring portion of the bottom of the container spaced apart from the slide plate.

Various other characteristics appear from the following description given with reference to the accompanying drawings, which show embodiments of the invention as non-limiting examples.

Figure 1:
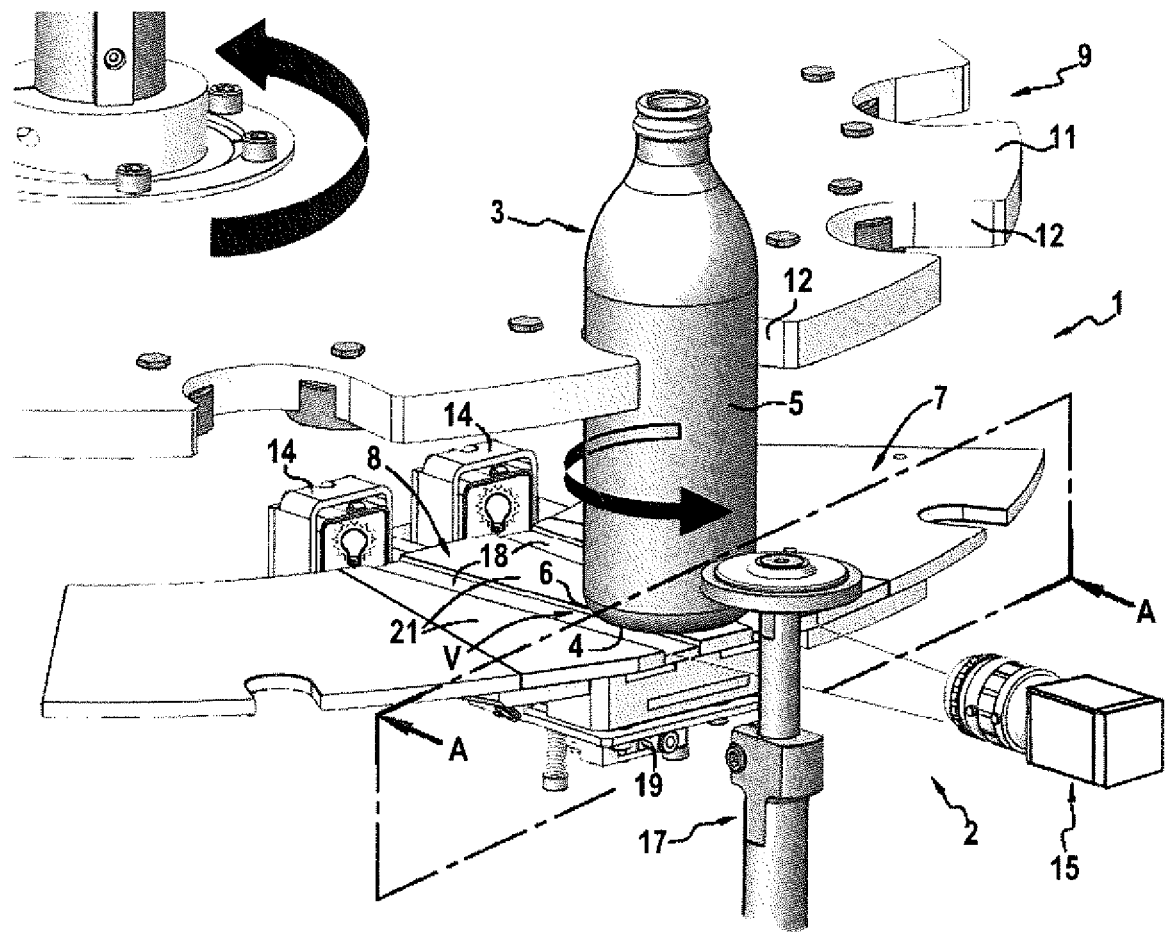
FIG. 1 is a perspective view of an inspection installation in accordance with the invention, shown in its inspection position.
Figure 2:
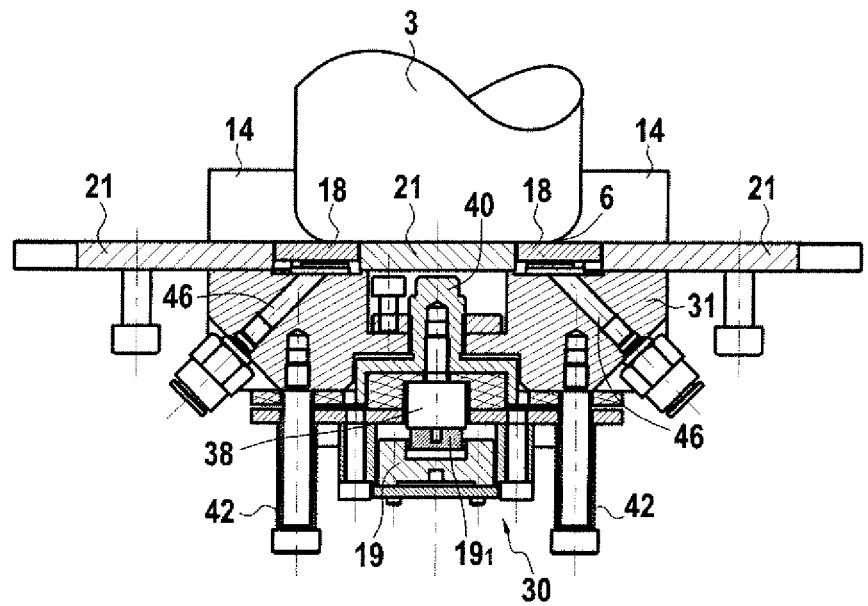
FIGS. 2 and 3 are cross-section views in elevation of the inspection installation of the invention taken substantially on lines A-A of FIG. 1, the installation being shown respectively in a position for transferring containers and in a position for inspecting them.
Figure 3:
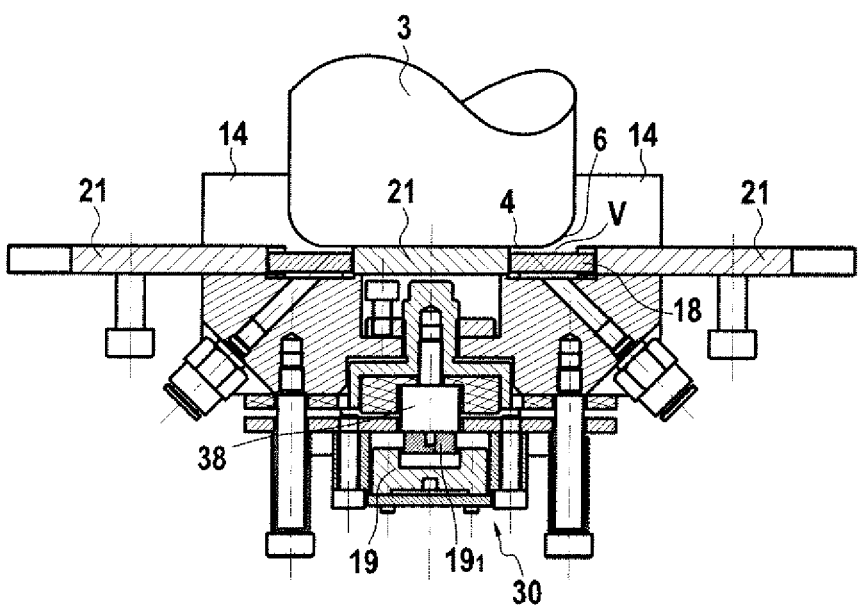
Figure 4:
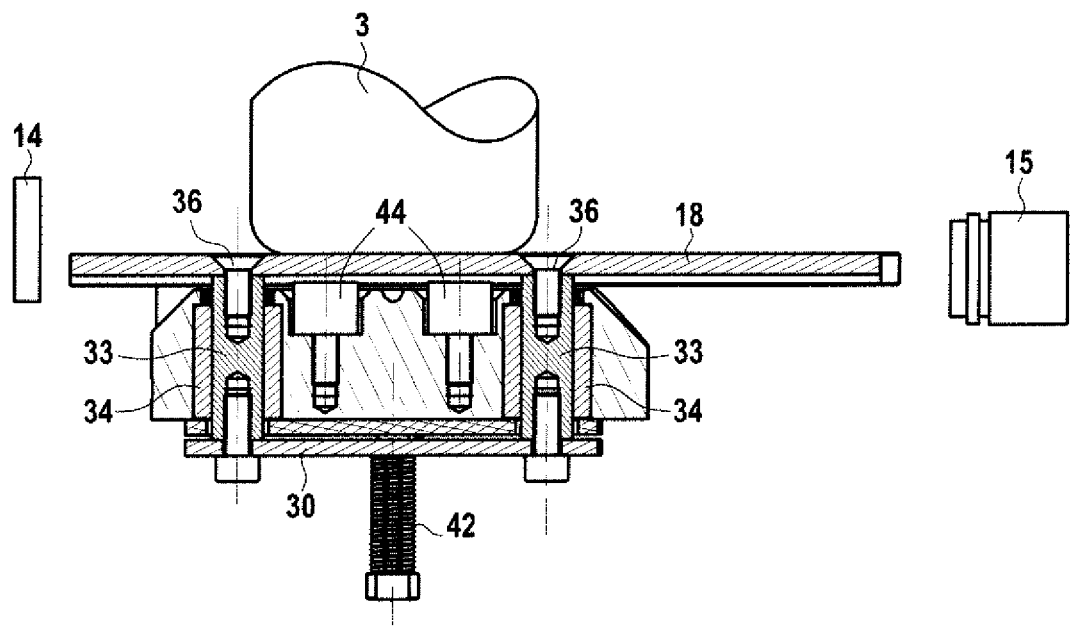
FIGS. 4 and 5 are section views in elevation of the inspection installation in accordance with the invention through a movable portion of the slide plate, the installation being shown respectively in a position for transferring containers and in a position for inspecting them.
Figure 5:
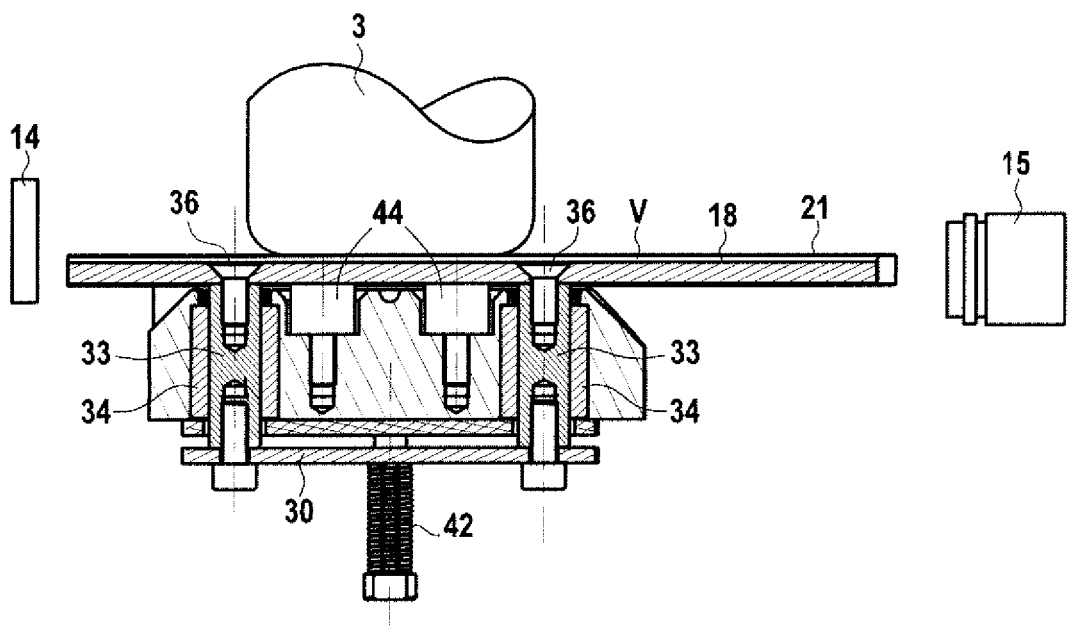
Figure 6:
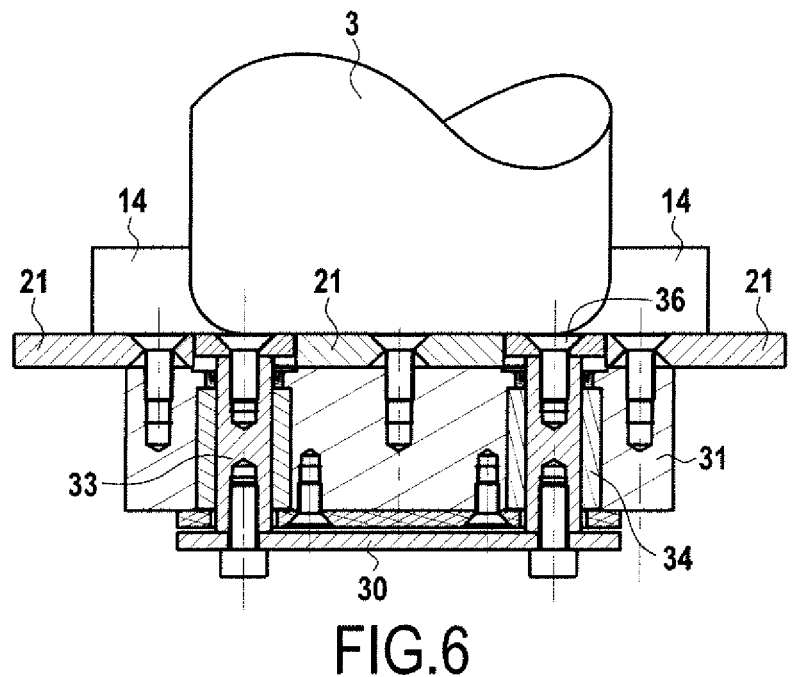
FIGS. 6 and 7 are cross-section views in elevation of the inspection installation in accordance with the invention, shown respectively in a position for transferring containers and in a position for inspecting them.
Figure 7:
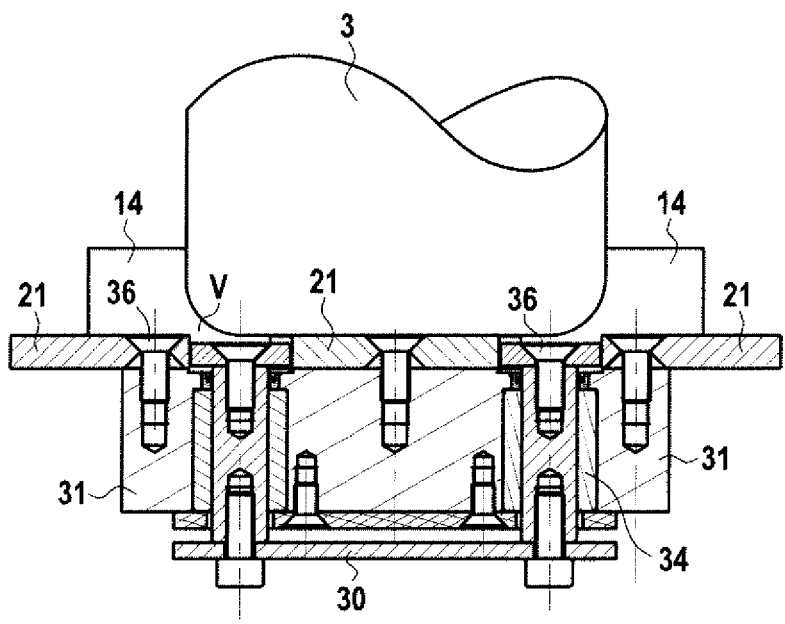

The invention provides an installation 1 comprising at least one optical inspection station 2 for inspecting containers 3, e.g. made of glass, such as bottles. In conventional manner, each container 3 presents a bottom 4 from which there rises a vertical body 5. The bottom 4 is connected to the vertical body 5 via a heel or insweep 6.

The installation 1 has a support table 7 for the containers 3. In the inspection station 2, the support table 7 presents a slide plate 8 on which the bottom 4 of a container stands while it is being inspected in said station. The installation 1 also has a system 9 for moving the containers and serving firstly to bring containers 3 to the inspection station 2, and secondly to transfer them from the inspection station 2 after the inspection operation. In the example shown, the movement system 9 comprises a transfer star 11 provided with slots 12, each serving to receive the body of a container. The transfer star 11 is controlled to rotate so as to position bottles in succession in the inspection station 2. Naturally, each container 3 is held in the inspection station for the length of time needed to perform the intended inspection operation. In the example shown in the drawings, the movement system 9 is rotary, however it is clear that containers could be delivered and removed by a movement system that is different, e.g. linear.

The inspection station 2 is arranged to take optical measurements involving at least a portion of the bottom of the container. In a preferred embodiment, the inspection station 2 is adapted to measure the verticality of containers in accordance with the method described in patent FR 3 000 193. In another embodiment, the inspection station 2 is adapted to detect an orthogonality defect of the bottom of the container relative to its axis of symmetry, which may be referred to as a tilted bottom.

In general manner, the inspection station 2 has at least one light source 14 and at least one light sensor 15 suitable for receiving a light beam emitted by the light source. The term "light beam" is used to designate a set of light rays emitted by a light source of finite size in a given direction. A light beam may be divergent, parallel, or convergent. A light beam may be defined, e.g. by passing through an orifice, or when it is occluded by an article.

The light source(s) 14 is/are positioned on one side of the container, i.e. on one side of the slide plate 8, while the light sensor(s) 15 is/are placed on the other side of the container, i.e. on the other side of the slide plate 8. Thus, each container 3 is positioned in the inspection station between the light source 14 and the light sensor 15, enabling each container to be observed from the side or laterally, and including a portion of the bottom of the container.

The inspection station 2 has an analysis and processor unit (not shown) connected to each light sensor 15 and configured to determine an orthogonality defect or to measure the verticality of the containers. The analysis and processor unit does not specifically form part of the subject matter of the invention and it is not described in greater detail.

In a preferred application as shown in the drawings, the inspection station 2 is adapted to measure the verticality of containers in accordance with the method described in patent FR 3 000 193. In this embodiment, the inspection station 2 includes a system 17 for causing the container to rotate about its vertical axis during the inspection operation.

Figure 8:
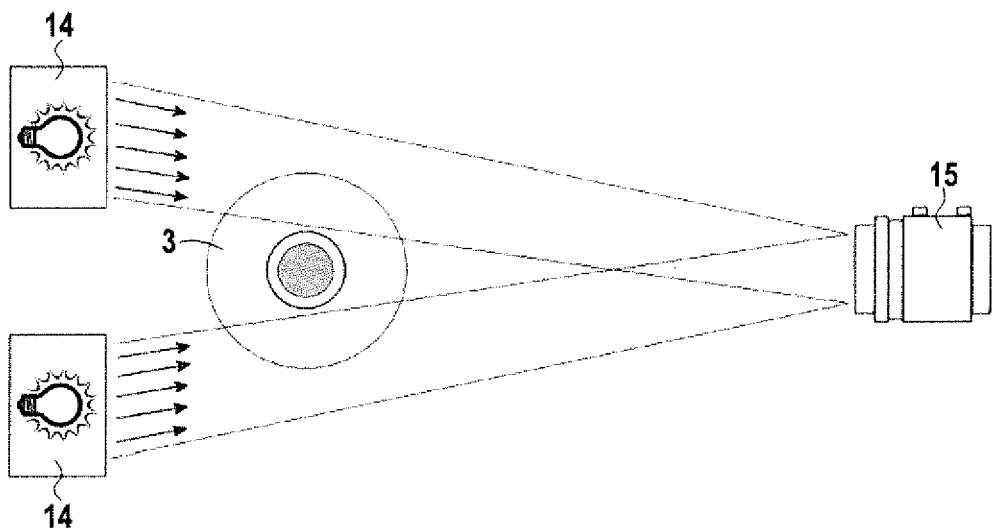
FIG. 8 is a diagrammatic plan view of the inspection installation in accordance with the invention.

In this application, each light sensor 15 is an image sensor, i.e. a matrix camera having a lens. At least one of these image sensors takes matrix images including the left and right portions of the heels of containers. In a configuration that is not shown, two separate image sensors may be used, the first image sensor taking matrix images including the left portion of the heel, while the second image sensor takes images of the right portion of the heel. As explained in greater detail below, such an image sensor 15 receives two light beams emitted by at least one light source, and in the example shown by two light sources 14 (FIG. 8). The light sources 14 are positioned on one side of the slide plate 8, while the light sensor 15 is placed on the other side of the slide plate 8. Thus, each container 3 is positioned in the inspection station between the light sources 14 and the light sensor 15 for observing the profile of each container, viewed at the heel and the bottom of the container.

The inspection station 2 may be configured to take other types of optical measurements involving at least a portion of the bottom of the container. This applies for example to a station for detecting orthogonality of the bottom of the container relative to its vertical axis of symmetry. In this application, the inspection station 2 has as its light sensor 15 a simple cell for measuring the power of a light beam emitted by a light source 14 situated on the side of the container opposite from the cell. The light source directs a light beam towards the cell at constant intensity. During the measurement operation, the container 3 is driven in rotation and the light beam is limited at the top by the bottom of the container and at the bottom by the slide plate of the support table or by a stationary shutter that acts as a reference.

When the distance between the bottom of the container and the reference decreases (or else increases), the light beam is reduced in part (or else is enlarged) such that the light power received by the cell is a function of this distance. It is thus possible to detect anomalies in the rotation of the bottoms of containers by using two devices of this type arranged symmetrically relative to the axis of rotation and by analyzing variations of power at the two cells. Assuming that the body of the container rotates about a vertical axis of symmetry, then anomalies of rotation stem from an orthogonality defect of the bottom relative to the vertical axis of symmetry, which may be referred to as a tilted bottom.

According to a characteristic of the invention, the slide plate 8 has at least one portion 18 that is movable under the action of an actuator 19 for moving this movable portion between a transfer position in which the movable portion 18 is flush with the table 7, and an inspection position in which this movable portion 18 is lowered so that a portion of the bottom 4 of the container is spaced apart from the slide plate 8.

As shown in FIGS. 1 to 7, the slide plate 8 has two movable portions 18 situated beneath two symmetrically opposite portions of the bottom of the container. Naturally, an embodiment could be provided in which the slide plate 8 has a single movable portion 18 situated under a portion of the bottom of the container. It should be understood that in the transfer position shown in FIGS. 2, 4, and 6, the slide plate 8 presents a plane slide surface with no projecting portion. In this transfer position, a container 3 situated upstream from the inspection station 2 can be moved from the support table 7 onto the slide plate 8 in order to be placed in the inspection station 2. The container 3 thus slides on a plane surface of the support table 7 until it reaches the slide plate 8. Likewise, in this transfer position, a container 3 that has been inspected by the station 2 can be moved from the slide plate 8 onto the support table 7 away from the inspection station 2. The container 3 also slides on a plane surface when it leaves the slide plate 8 in order to be returned onto the support table 7.

Figure 9:
FIG. 9 is an image of the profile of a container obtained by the inspection installation in accordance with the invention.

As can be seen in FIGS. 1, 3, 5, and 7, when the movable portions 18 of the slide plate 8 occupy their inspection position, a portion of the bottom 4 of the container is spaced apart from the slide plate 8. Thus, when the movable portions 18 occupy this inspection position, the sensor 15 can receive a light beam propagating in an inspection volume V in which at least a portion of the bottom 4 of the container is situated that is spaced apart from the movable portions 18 of the slide plate 8 (FIG. 9). Thus, between the bottom 4 of the container and the slide plate 8, the light beam coming from the light source(s) 14 propagates freely to the light sensor 15. It is thus possible to observe the profile or silhouette of the bottom 4, and preferably of the bottom 4 and of the insweep at one side of the container, or preferably on both sides of the container.

Each movable portion 18 is in the form of an elongate plate extending over the entire width of the support table 7, being received inside a cutout formed in the support table 7. The shape of the cutout is suitable for enabling light to pass between the light source 14 and the light sensor 15 along the observation direction(s), which direction(s) depend(s) on the positions of the light sensor, and of the optical center of its lens, and on the direction of the optical axis. The shape of the cutout is also matched to the shapes and the dimensions of the containers 3. For example, in order to be able to inspect ranges of containers having different diameters, a plurality of sets of slide plates may be provided that are changed so as to go from containers of small diameters to containers of large diameters.

Furthermore, the light sources 14 are positioned on one side of the slide plate 8, substantially level with the slide plate, while light sensor 15 is placed on the other side of the slide plate 8, substantially level with the slide plate. Thus, when the movable portion 18 occupies its inspection position, a portion of the space situated under the bottom 4 of the container and between the light sources 14 and the image sensor 15 is released so as to allow light to pass freely to the light sensor (FIGS. 1, 3, 5, 7).

In the embodiment shown in FIGS. 1 to 7, the slide plate 8 has at least one movable portion 18 that is retractable or lowered, i.e. that is set back from or below stationary portions 21 of the slide plate 8 on either side of the movable portion 18. In a preferred example as shown, the slide plate 8 has two retractable movable portions 18, each movable portion lying between stationary portions 21 of the slide plate on either side thereof. Thus, in the inspection position of the slide plate 8, the movable portions 18 are situated at a level that is lower than the plane occupied by the stationary portions 21, thereby uncovering portions of the bottom 4 of the container on either side thereof relative to the slide plate. In the inspection position, the movable portions 18 are spaced apart from the bottom of the container, being lowered so as to be situated below the bottom of the container. The offset between the movable portion 18 and the stationary portion 21 may be greater or smaller, and typically lies in the range 0.2 millimeters (mm) to 2 mm. Naturally, this offset depends on optical inspection constraints. The movable and stationary portions 18 and 21 are adjusted so as to limit the clearance between the movable and stationary portions so that in the transfer position, the slide surface presented by the table is as continuous as possible.

Each container 3 moves in a single plane when the container is taken onto the slide plate 8 and when the container is transferred or discharged from the slide plate. It should be observed that the container remains in this plane while the movable portions 18 are retracted or lowered.

In the preferred application seeking to measure the verticality of containers in accordance with the method described in patent FR 3 000 193, the movable portions 18 are situated facing each portion of the bottom 4 adjacent to the insweep 6 of the container. Thus, in the inspection position, the container remains permanently in contact with the slide plate 8, being supported in the middle portion of its bottom by a stationary central portion 21.

Advantageously, it should be observed that the slide plate 8 defines two inspection volumes V for two symmetrical portions of the bottom of the container, by means of the two retractable movable portions 18 lying between stationary portions of the slide plate.

The movable plate(s) 18 is/are moved between the transfer position and the inspection position by means of an actuator 19. The path followed between these two positions may be arbitrary. In the description below, the movable plate(s) 18 move vertically, however it is clear that the movement may be the result of a combination of rectilinear and/or curved movements, or a pivoting movement, for example.

As can be seen more clearly in the figures, the movable portion(s) 18 of the slide plate 8 form part of a piece of moving equipment 30 that, in the preferred embodiment as shown, is guided to move vertically relative to a support 31 fastened to the table 7. This movable equipment 30 is provided with a system for guiding this movement in translation that includes at least one rod 33 co-operating with a bushing 34 carried by the support 31, there being four rods 33 and corresponding bushings 34 in the example shown.

According to an advantageous embodiment characteristic, the movable portion(s) 18 of the slide plate 8 is/are releasably fastened to the movable equipment 30. Thus, as can be seen more clearly in FIGS. 4 to 7, each movable portion 18 is fastened to the movable equipment 30 by assembly screws 36. These movable portions 18 can thus be changed easily if they become worn.

The movable equipment 30 is moved in translation by means of the actuator 19, which may be implemented in any suitable manner, such as for example an electrical or pneumatic actuator, or an electromagnet, or indeed a cam that is driven to pivot, or by an eccentric mechanism, or by a lever mechanism. In the example shown, the actuator 19 is a pneumatic actuator having its cylinder mounted on the movable equipment 30. The actuator 19 has a rod 19, acting on the support 31 via a high abutment 38.

According to an advantageous embodiment characteristic, the movable equipment 30 co-operates with the high abutment 38 when the movable portion(s) 18 of the slide plate occupy the transfer position. This high abutment 38 is made of damping material and it is fastened on the support 31. In an advantageous embodiment, the high abutment 38 is fitted with a system 40 for vertically adjusting the movable portion 18 relative to the table 7. This system 40, e.g. of the screw type, serves to adjust the vertical position of the abutment of the movable equipment 30 relative to the support 31. This adjustment serves to guarantee that the movable portions 18 and the stationary portions 21 of the slide plates are flush in the transfer position.

Advantageously, the movable equipment 30 is kept in contact against the high abutment 38 under the action of a resilient return force exerted by springs 42. In other words, the springs 42 continuously urge the movable equipment 30 so as to be in contact against the high abutment 38. As a result, the default position is the transfer position.

It should be observed that while the movable portions 18, and consequently the movable equipment, are occupying the inspection position, the movable equipment 30 likewise comes into contact with low abutments 44 that are carried by the support 31.

According to another characteristic, the installation includes at least one air-blow nozzle 46 for each movable portion 18, the nozzle delivering air under the movable portion and being in communication with an air feed device. The blown-in air serves to remove any dust or scrap so as to avoid the movable portions 18 jamming relative to the stationary portions 21.

The actuator 19 of the movable portion 18 of the slide plate is connected to a control unit that is also connected to the system 9 for moving the containers and to the inspection station 2. The control unit controls the actuator 19 so as to place each movable portion 18:

in its transfer position to enable the movement system to bring a container onto the slide plate 8;
in its retracted position during the inspection operation; and
at the end of the inspection operation, in its transfer position to enable the movement system 9 to transfer the container placed on the slide plate.

The installation of the invention can be used to perform a method of inspecting containers standing via their bottoms 4 on a support table 7 that are brought in succession to an inspection station in which each container is positioned on a slide plate 8. The method comprises the following steps:

positioning at least one movable portion 18 of the slide plate 8 in a transfer position in which this movable portion 18 is flush with the table 7;
moving a container 3 to bring it into the inspection station 2 by placing the bottom 4 of the container on the slide plate 8 of the table, the container 3 being positioned between at least one light source 14 and at least one light sensor 15 in order to observe the container in profile, the profile including at least a portion of the bottom of the container;

prior to the inspection operation, lowering the movable portion 18 of the slide plate into a retracted position in which at least a portion of the bottom 4 of the container is spaced apart from the slide plate so that the sensor 15 can receive a light beam propagating in an inspection volume V in which at least a portion of the bottom 4 of the container is situated spaced apart from the slide plate;

keeping the movable portion 18 in its inspection position during the inspection operation;

after the inspection operation and prior to transferring the container out from the inspection station, causing the movable portion 18 to move up so as to place it in its transfer position;

transferring the container 3 out from the inspection station after the inspection operation; and successively repeating the above steps for the following containers that are to be inspected.

The inspection method thus makes it possible to observe the containers in profile, each profile covering a portion of the bottom of a container. It should be observed that at least one movable portion 18 of the slide plate 8 can be moved vertically into the inspection position so that two symmetrical portions of the bottom of the container are spaced apart from the slide plate.

Depending on the nature of the inspection that is to be performed, it should be observed that during the inspection operation provision may be made to drive the container in rotation about its vertical axis through at least one revolution.

In a first application, the method seeks to use the light sensor 15 during rotation of the container to recover the light beams from the light source 14 that propagate in the inspection volumes in which there are situated at least two symmetrical portions of the bottom of the container that are spaced apart from the slide plate, and to analyze the recovered light beams in order to detect an orthogonality defect of the bottom relative to the axis of symmetry of the container.

In a second application, the method seeks to use an image sensor as a light sensor 15 and to position the light source 14 and the image sensor 15 relative to the movable portion of the slide plate in such a manner that in the inspection position of the movable portion the sensor can take an image I of the profile of at least the insweep and the neighboring portion of the bottom of the container spaced apart from the slide plate. FIG. 9 shows an example of an image I showing the insweep and the bottom of a container as obtained using an image sensor 15.

The invention is not limited to the examples described and shown since various modifications may be applied thereto without going beyond its ambit.

The invention claimed is:

1. An installation comprising:
   at least one optical inspection station (2) for inspecting containers (3), the at least one optical inspection station including at least one light source (14) and at least one light sensor (15);
   a support table (7) for the containers, the support table having a slide plate (8) on which a bottom of each container stands while the container is being inspected by said at least one optical inspection station while it is positioned between the at least one light source and the at least one light sensor;
   a movement system (9) for moving the containers and serving firstly to position the containers in succession on the slide plate while an inspection operation is taking place, and secondly to transfer the containers successively from the at least one optical inspection station after the inspection operation,
   wherein the slide plate (8) has at least one retractable movable portion (18) lying between stationary portions (21) of the slide plate, the movable portion (18) being movable under an action of an actuator (19) for moving the movable portion (18) between a transfer position in which the movable portion is flush with the support table and an inspection position in which the movable portion (18) is lowered relative to the stationary portions such that a portion of the bottom (4) of the container is spaced apart from the slide plate (8), and in that the at least one light source (14) and the at least one light sensor (15) are positioned relative to the movable portion (18) of the slide plate in such a manner that in the inspection position of the movable portion, the at least one light sensor receives a light beam emitted by the light source and propagating in an inspection volume (V) in which at least a portion of the bottom (4) of the container is situated spaced apart from the slide plate.

2. The installation according to claim 1, wherein the slide plate (8) defines two inspection volumes (V) for two symmetrical portions of the bottom of the container by using two retractable movable portions (18), each lying between stationary portions of the slide plate.

3. The installation according to claim 1, wherein the movable portion(s) (18) of the slide plate (8) form a portion (s) of a piece of movable equipment (30) that is guided in vertical movement and that co-operates with a high abutment (38) when the movable portion(s) (18) of the slide plate occupy the transfer position, the piece of movable equipment (30) being kept in contact with the high abutment under action of a resilient return force.

4. The installation according to claim 3, wherein the high abutment (38) is provided with a system for providing vertical adjustment of the movable portion relative to the table.

5. The installation according to claim 3, wherein the movable portion(s) (18) of the slide plate (8) is/are releasably fastened to the movable equipment (30).

6. The installation according to claim 1, further comprising, for each movable portion, at least one air-blow nozzle (46) opening out under the movable portion and communicating with an air-feed device.

7. The installation according to claim 1, wherein in that the actuator (19) of the movable portion (18) of the slide plate is connected to a control unit having connected thereto the movement system and the at least one optical inspection station, the control unit controlling the actuator to place the movable portion:
   in a transfer position in order to enable the movement system to bring a container onto the slide plate;
   in an inspection position during the inspection operation; and
   at the end of the inspection operation, in the transfer position to enable the movement system to transfer the container that is placed on the slide plate.

8. The installation according to claim 1, wherein the at the at least one light sensor (15) is an image sensor.

9. The installation according to claim 8, wherein the at least one light source (14) and the image sensor are positioned relative to the movable portion of the slide plate in such a manner that in the inspection position of the movable portion, the image sensor takes an image of a profile of at least an insweep and of a neighboring portion of the bottom of the container spaced apart from the slide plate.

10. An inspection method using an optical inspection station to inspect containers standing via their bottoms (4) on a support table, the method comprising:

positioning containers (3) in succession on a slide plate (8) of the support table on which a bottom of each container stands during an inspection operation by said optical inspection station while positioned between a light source (14) and a light sensor (15); and transferring the containers (3) successively out from the inspection station (2) after the inspection operation;

the method further comprising:

positioning at least one of the containers (3) relative to at least one movable portion (18) of the slide plate (8), which portion is placed prior to a container being brought into the optical inspection station in a transfer position in which said movable portion is flush with the table;

before the inspection operation, lowering the movable portion (18) into an inspection position in which the movable portion (18) is set back from the bottom (4) of the container having at least a portion thereof spaced apart from the slide plate so that the light sensor (15) receives a light beam propagating in an inspection volume in which there is situated at least a portion of the bottom of the container spaced apart from the slide plate;

keeping the movable portion (18) in the inspection position during the inspection operation; and after the inspection operation, and before transferring the container out from the inspection station, causing the movable portion (18) to move up into the transfer position.

11. The inspection method according to claim 10, further comprising vertically lowering two movable portions (18) of the slide plate into the inspection position in which two symmetrical portions of the bottom of the container are spaced apart from the slide plate.

12. The inspection method according to claim 10, wherein during the inspection operation, the container (3) rotates about its vertical axis through at least one revolution.

13. The inspection method according to claim 12, wherein, during rotation of the container, the light sensor (15) recovers light beams propagating in the inspection volumes (V) in which there are situated at least two symmetrical portions of the bottom of the container spaced apart from the slide plate, and analyzes in analyzing the recovered light beams to detect an orthogonality defect of the bottom relative to an axis of symmetry of the container.

14. An inspection method according to claim 10, wherein an image sensor is used as the light sensor (15), and in positioning the light source (14) and the image sensor (15) relative to the movable portion (18) of the slide plate, in the inspection position of the movable portion, the sensor (15) takes an image of the profile of at least of an insweep (6) and of a neighboring portion of the bottom (4) of the container spaced apart from the slide plate.

* * * * *